(12) United States Patent
Fairbanks et al.

(10) Patent No.: US 10,704,583 B2
(45) Date of Patent: Jul. 7, 2020

(54) CABLE STAPLE ASSEMBLY AND SYSTEM

(71) Applicant: Black & Decker Inc., New Britain, CT (US)

(72) Inventors: Jonathan W. Fairbanks, Coventry, RI (US); James Sareault, Bend, OR (US); Richard Waterman, North Kingstown, RI (US)

(73) Assignee: Black & Decker Inc., New Britain, CT (US)

( * ) Notice: Subject to any disclaimer, the term of this patent is extended or adjusted under 35 U.S.C. 154(b) by 208 days.

(21) Appl. No.: 15/719,766

(22) Filed: Sep. 29, 2017

(65) Prior Publication Data

US 2019/0101147 A1   Apr. 4, 2019

(51) Int. Cl.
*F16B 15/08* (2006.01)
*H02G 3/32* (2006.01)
(Continued)

(52) U.S. Cl.
CPC .......... *F16B 15/08* (2013.01); *F16B 15/0015* (2013.01); *H01B 17/66* (2013.01);
(Continued)

(58) Field of Classification Search
CPC ....... F16B 15/08; F16B 15/0015; F16B 15/02
(Continued)

(56) References Cited

U.S. PATENT DOCUMENTS 2,351,045 A * 6/1944 Heller ..................... F16B 15/08
206/343
2,526,902 A   7/1947 Rublee
(Continued)

FOREIGN PATENT DOCUMENTS

GB            797766      7/1958
GB         2539105 A      7/2016
(Continued)

OTHER PUBLICATIONS

International Search Report and Written Opinion dated Dec. 4, 2018 in corresponding International Application No. PCT/US2018/053210.

*Primary Examiner* — Flemming Saether
(74) *Attorney, Agent, or Firm* — Harness, Dickey & Pierce, P.L.C.

(57) ABSTRACT

Frangible connectors can extend between and can alone couple adjacent insulator bodies together. The insulator bodies can also include counteracting frangible connectors that can be spaced from and coupled solely to a single one of the plurality of insulator bodies. The counteracting frangible connectors provide a counteracting shearing operation, which can help counteract the counterclockwise rotational movement that the frangible connectors tend to impart as they are sheared. The insulator bodies can be mounted on staples. The insulator bodies can have an upper bridge profile and the staples can have a lower crown profile opposing the upper bridge profile. The lower crown profile and the upper bridge profile can have opposite end portions that engage each other and can have central portions that are simultaneously spaced from each other to provide a central space between corresponding central portions of the insulator bridge and the staple crown.

17 Claims, 7 Drawing Sheets

(51) Int. Cl.
    *H02G 3/00*     (2006.01)
    *F16B 15/00*     (2006.01)
    *H01B 17/66*     (2006.01)
    *B25C 5/16*     (2006.01)

(52) U.S. Cl.
    CPC ................. *H02G 3/26* (2013.01); *H02G 3/32* (2013.01); *B25C 5/1665* (2013.01)

(58) Field of Classification Search
    USPC .......... 411/469, 441, 444, 473–476; 174/159
    See application file for complete search history.

(56) References Cited

U.S. PATENT DOCUMENTS

| | | | | |
|---|---|---|---|---|
| 3,154,999 | A * | 11/1964 | Stewart | F16B 15/02 174/159 |
| 3,241,797 | A * | 3/1966 | Anderson | F16L 3/04 174/159 |
| 3,787,608 | A | 1/1974 | Colby et al. | |
| 3,863,824 | A | 2/1975 | Bakoledis | |
| 3,894,174 | A | 7/1975 | Cartun | |
| 3,940,844 | A | 3/1976 | Colby et al. | |
| 3,944,067 | A | 3/1976 | Bakoledis | |
| 4,697,045 | A | 9/1987 | Beatty | |
| 4,805,617 | A | 2/1989 | Bedi et al. | |
| 4,932,821 | A | 6/1990 | Steffen et al. | |
| 5,069,340 | A | 12/1991 | Ernst et al. | |
| 5,223,675 | A | 6/1993 | Taft | |
| 5,258,012 | A | 11/1993 | Luscombe et al. | |
| 5,393,184 | A * | 2/1995 | Beeuwkes | F16B 15/0015 174/159 |
| 5,718,548 | A | 2/1998 | Cotellessa | |
| 5,735,444 | A | 4/1998 | Wingert | |
| 6,530,803 | B1 | 3/2003 | Chen | |
| 6,634,537 | B2 | 10/2003 | Chen | |
| 6,779,958 | B2 | 8/2004 | Rosenbaum | |
| 6,814,231 | B2 | 11/2004 | Gupta | |
| 7,118,318 | B2 * | 10/2006 | Ryals | F16B 15/0015 411/475 |
| 7,546,988 | B1 * | 6/2009 | Schecter | F16L 3/04 248/65 |
| 7,617,883 | B1 | 11/2009 | Mangone, Jr. | |
| 7,918,374 | B2 | 4/2011 | Gardner et al. | |
| 8,282,328 | B2 * | 10/2012 | Gardner | B25C 5/15 174/159 |
| 8,413,867 | B2 | 4/2013 | Gardner et al. | |
| 8,556,073 | B2 | 10/2013 | Liang | |
| 8,939,340 | B2 | 1/2015 | Gardner et al. | |
| 9,422,962 | B1 | 8/2016 | Stratton et al. | |
| 2004/0262461 | A1 | 12/2004 | Del Re et al. | |
| 2006/0198718 | A1 * | 9/2006 | Chen | F16B 15/06 411/475 |
| 2008/0179371 | A1 | 7/2008 | Gardner et al. | |

FOREIGN PATENT DOCUMENTS

| | | |
|---|---|---|
| JP | S5676280 A | 6/1981 |
| JP | S56118770 A | 9/1981 |
| JP | H0293109 A | 4/1990 |
| JP | H08317537 A | 11/1996 |

\* cited by examiner

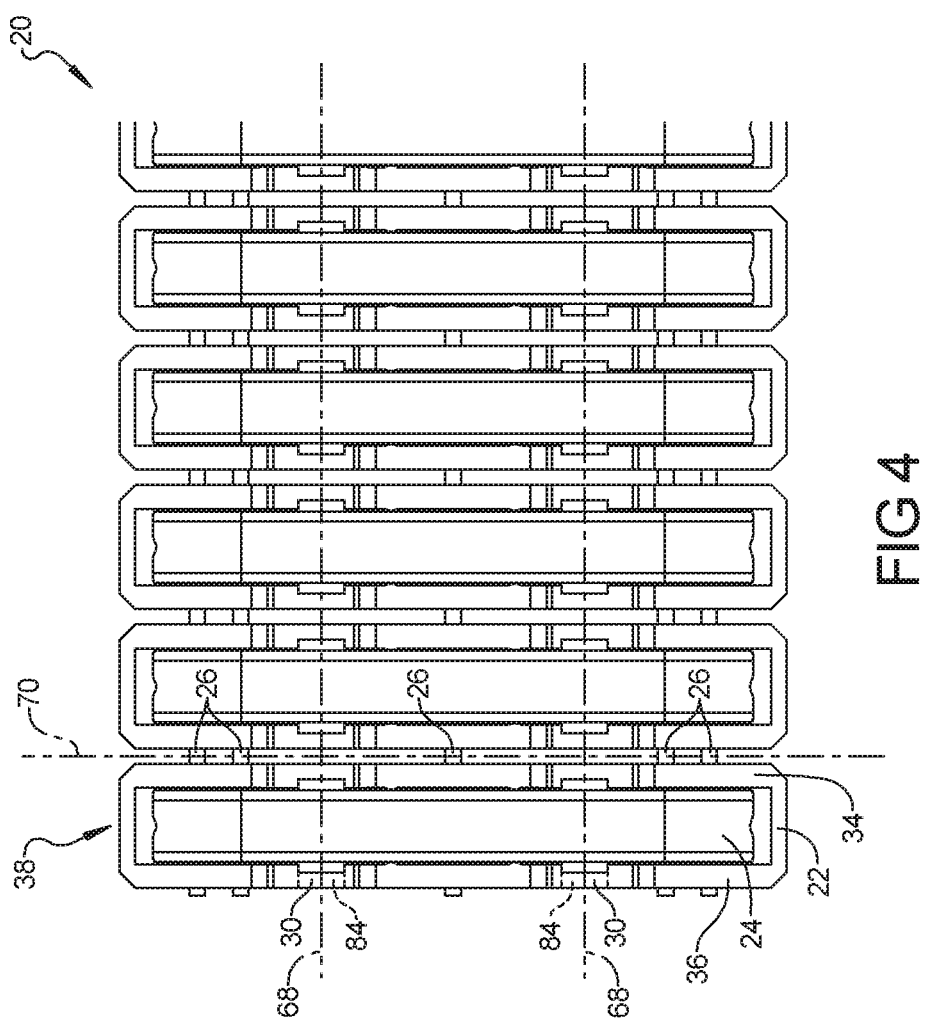

CABLE STAPLE ASSEMBLY AND SYSTEM

FIELD

The present disclosure relates to cable staple assemblies provided in stick form for use with a staple driving tool.

BACKGROUND

This section provides background information related to the present disclosure which is not necessarily prior art.

Cable staple assemblies provided in stick form typically include frangible connectors between adjacent pairs of connectors. As a lead staple subassembly in a staple driving tool is driven, the frangible connectors between it and the second staple are broken. The frangible connectors that are broken in a driving operation are only on the trailing side of the lead staple subassembly. Thus, the breaking of the frangible connectors can cause problematic counterclockwise rotation of the lead staple subassembly as it travels through the drive channel of the tool. It would be desirable to provide a consistent, reliable way of causing the lead staple subassembly to either remain aligned with, or to rotate slightly clockwise (which is much less problematic), as it travels through the drive channel of the tool.

The depth to which a staple is driven by a staple driving tool can be impacted by various parameters, including wood type/density, grain location, tool nose position, and insulator attachment strength. Depending on how the user adjusts the depth of drive setting on the tool or holds the tool relative to the work surface, the staple insulator can be driven too shallowly or too deeply, which can unduly bite into the outer insulation of the electrical cable and damage or otherwise compromise the integrity of the electrical wiring. It would be desirable to provide a consistent, reliable way of snugging the staple insulator against the electrical cable without unduly biting into the cable over a large range of variations in the depth to which a staple is driven.

SUMMARY

This section provides a general summary of the disclosure, and is not a comprehensive disclosure of its full scope or all of its features.

In accordance with one aspect of the present disclosure, a cable staple assembly for use with a staple driving tool having a driver and a cooperating breaking portion can be provided. The cable staple assembly can include a plurality of insulator bodies having frangible connectors extending between adjacent pairs of the insulator bodies. Each of the insulator bodies can have a counteracting frangible portion, and an insulator bridge extending between a pair of leg recesses. The frangible connectors alone can extend between and couple the plurality of insulator bodies together into a strip. Each counteracting frangible portion can be spaced from the frangible connectors and can be coupled solely to a single one of the plurality of insulator bodies. In addition, the cable staple assembly can include a plurality of staples. Each staple can have a pair of legs extending from opposite ends of a staple crown with the pair of legs being received in the pair of leg recesses of one of the insulator bodies.

In accordance with another aspect of the present disclosure, a cable staple assembly can include a plurality of insulator bodies frangibly coupled together into a strip. Each insulator body can have an insulator bridge extending between a pair of leg recesses. The insulator bridge can have an upper bridge profile. In addition, the cable staple assembly can include a plurality of staples. Each staple can have a pair of legs extending from opposite ends of a staple crown that has a lower crown profile with the pair of legs received in a respective pair of leg recesses of one of the insulator bodies and with the lower crown profile opposing the upper bridge profile. The lower crown profile and the upper bridge profile can have opposite end portions engaging each other adjacent the opposite ends of the staple crown. The lower crown profile and the upper bridge profile can also have central portions spaced from each other between the engaging opposite end portions to provide a central space between corresponding central portions of the insulator bridge and the staple crown.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a partial top plan view of a leading end of the cable staple assembly of FIG. 1.

Corresponding reference numerals indicate corresponding parts throughout the several views of the drawings.

DETAILED DESCRIPTION

Figure 1:
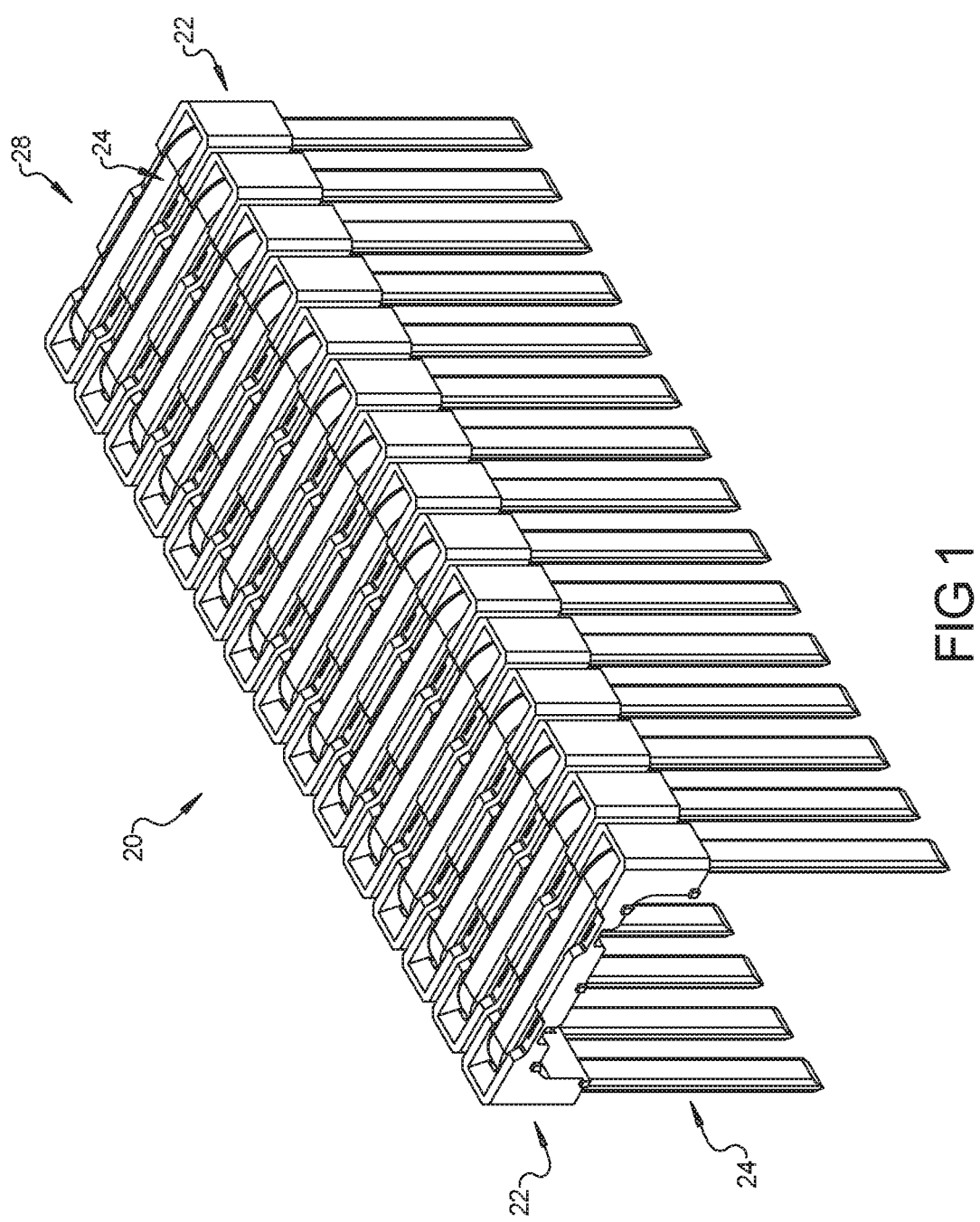
FIG. 1 is a perspective view of one example embodiment of a cable staple assembly for use with a staple driving tool in accordance with the present disclosure.
Figure 2:
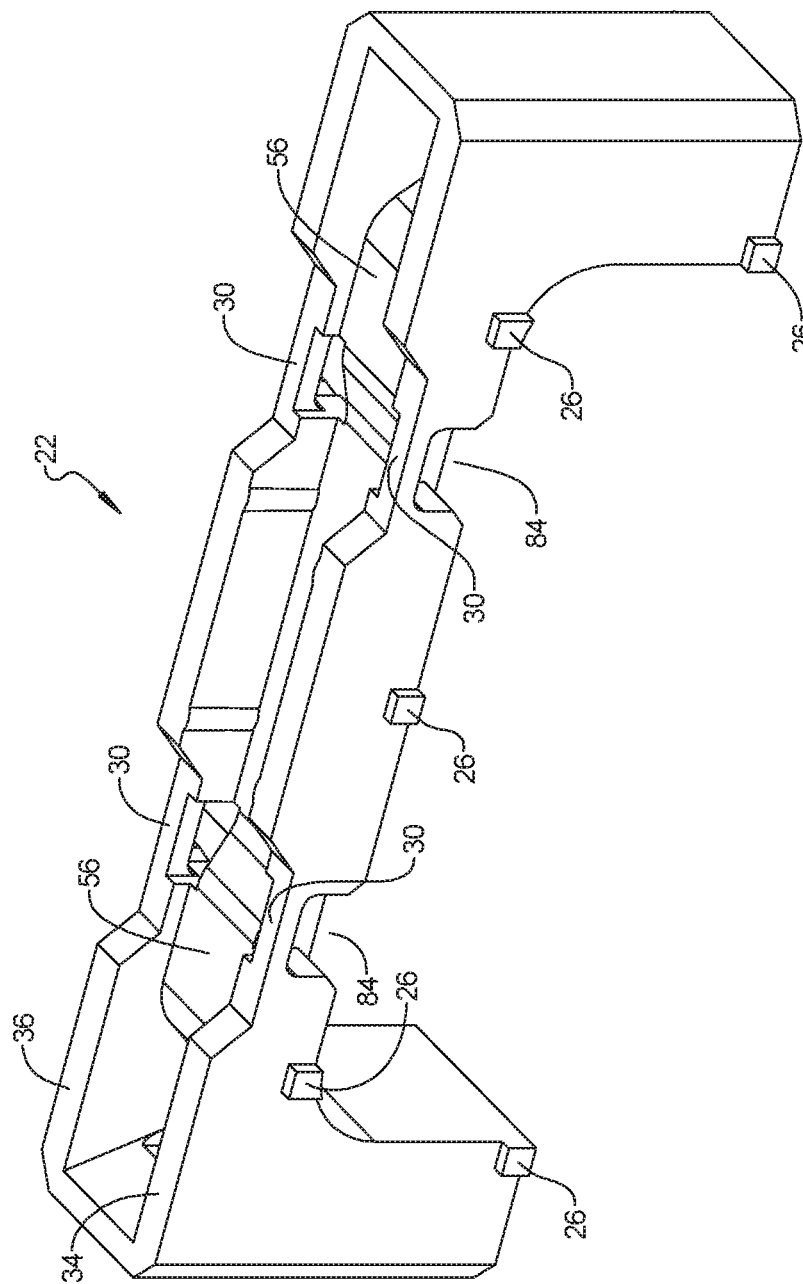
FIG. 2 is a perspective view of one of the insulator bodies of the cable staple assembly of FIG. 1.
Figure 3A:
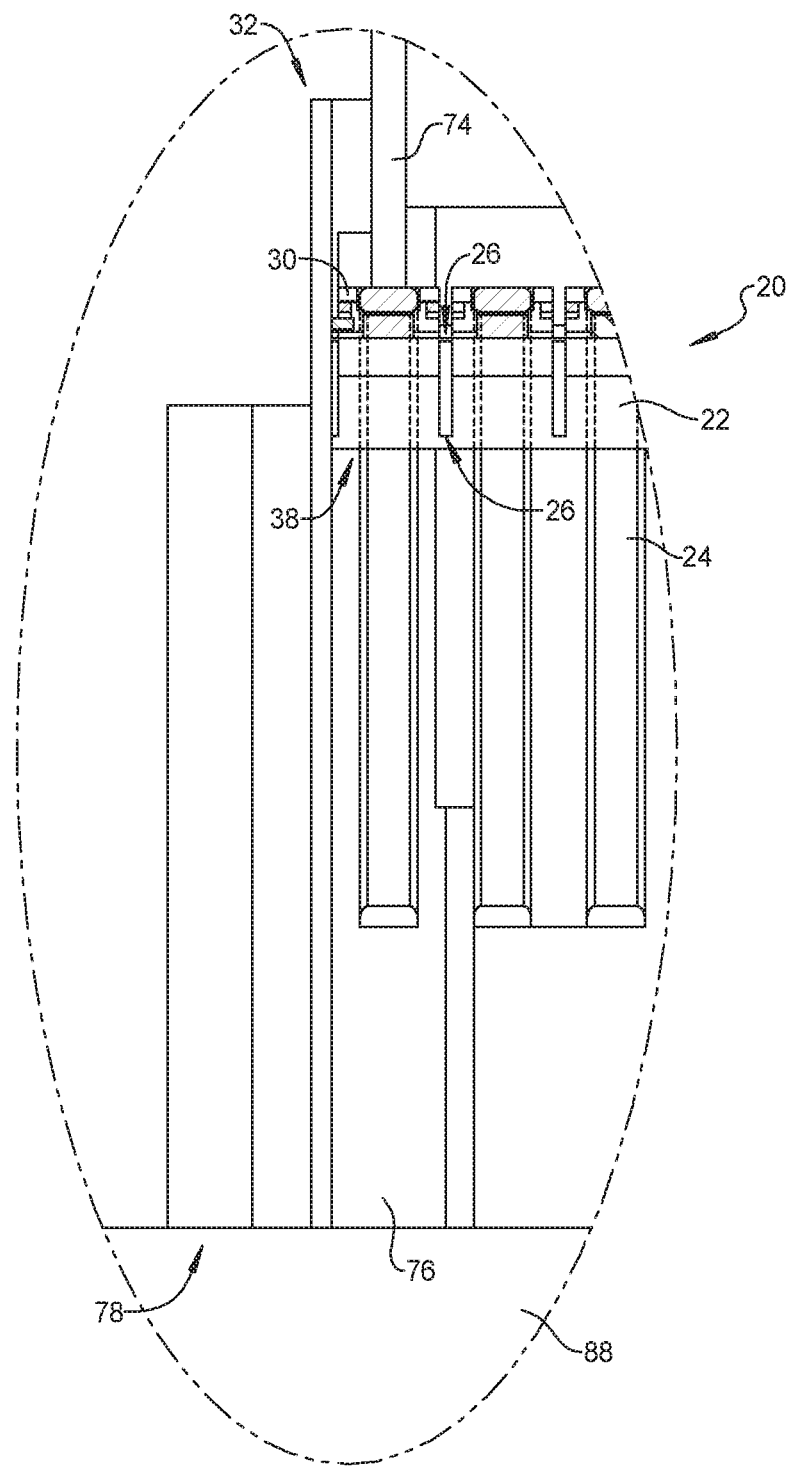
FIG. 3A is a partial cross-sectional view of a lead end of the cable staple assembly of FIG. 1 mounted in the nosepiece of a staple driving tool.
Figure 3B:
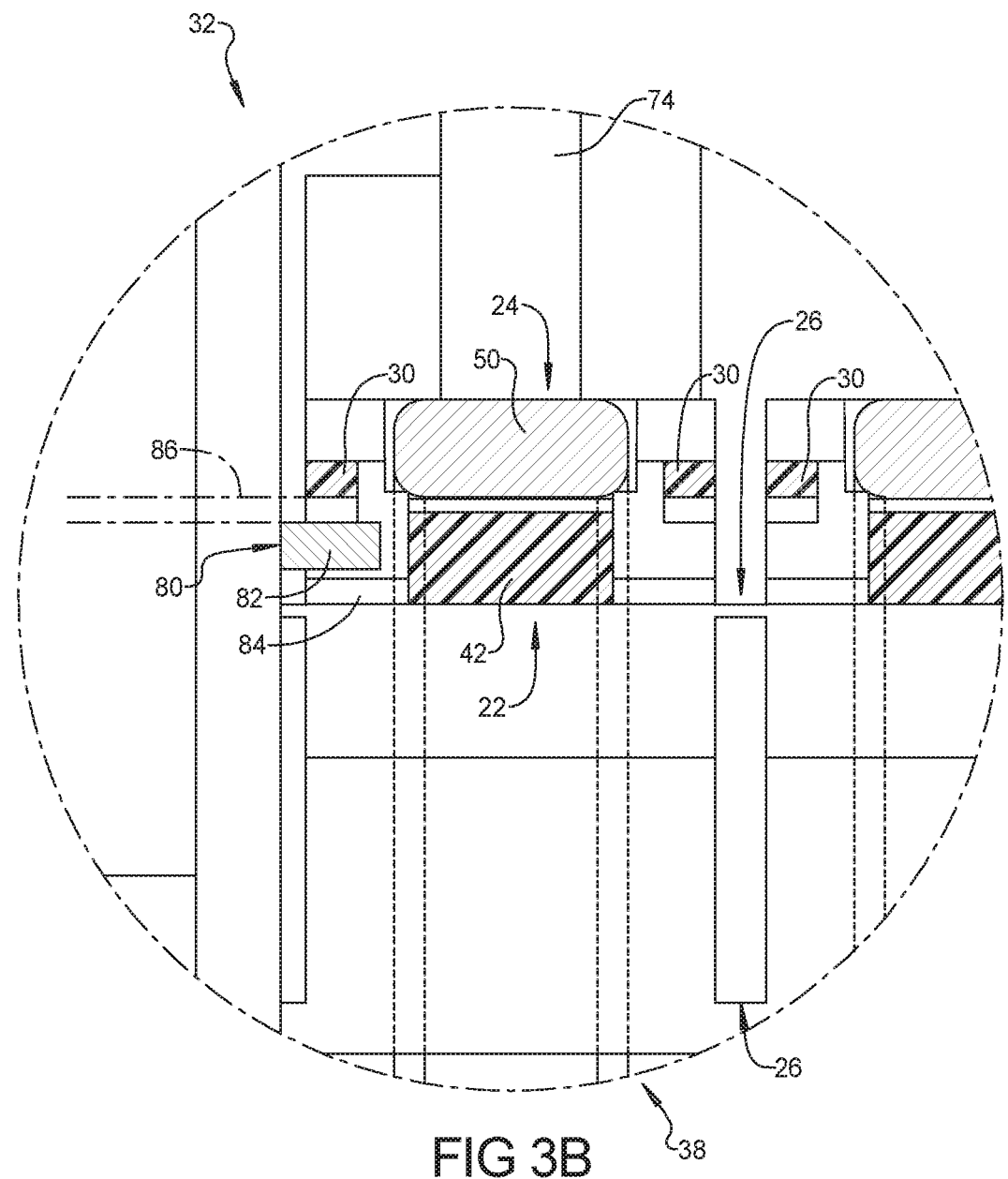
FIG. 3B Is an enlarged portion of the FIG. 3A.
Figure 5:
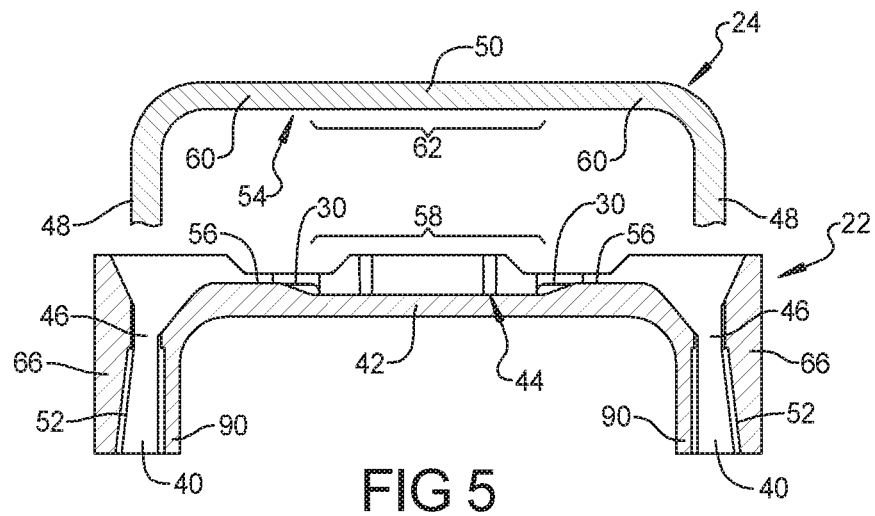
FIG. 5 is a partial cross-sectional exploded view of the cable staple assembly of FIG. 1.

Example embodiments will now be described more fully with reference to the accompanying drawings.

FIGS. 1-7 illustrate one example embodiment of a cable staple assembly 20 in accordance with the present disclosure. This example cable staple assembly 20 generally includes a plurality of insulator bodies 22 and a plurality of staples 24. The insulator bodies 22 can have frangible connectors 26 that extend between and couple adjacent pairs of the plurality of insulator bodies 22 together into a strip 28. Thus, each frangible connector 26 is coupled at its ends to different, adjacent ones of insulator bodies 22.

Each insulator body 22 can additionally also include at least one counteracting frangible portion 30 that is separate or spaced from, or independent of, the frangible connectors 26. Breaking the frangible connectors 26 between an adjacent pair of insulator bodies 22 alone is sufficient to separate the adjacent pair of insulator bodies 22 from each other. In contrast, breaking the counteracting frangible portions 30 does not result in separation of the adjacent pairs of insulator bodies 22. This is because the counteracting frangible portions 30 are not coupled at ends to adjacent insulator bodies 22 like the coupling frangible connectors 26. Each counteracting frangible portions 30 is coupled solely to a single one of the insulator bodies 22. For example, both ends of the counteracting frangible portions 30 are coupled to the same insulator body 22.

The counteracting frangible portions 30 can extend longitudinally between opposite connected ends in a portion direction that is substantially parallel to direction or plane 70, which extends substantially parallel to the longitudinal leading and trailing sides 36 and 34, respectively, of the insulator bodies 22. The counteracting frangible portions 30 can be designed to shear or break across a portion cross-section generally indicated by plane 68, which extends substantially perpendicular to the longitudinal leading and trailing sides 36 and 34, respectively, of the insulator bodies 22. For example, a recess 84 can be provided in the longitudinal leading side 36 of the insulator body 22 and a corresponding counteracting frangible portion 30 can span across an upper end of each recess 84. Opposite ends of each counteracting frangible portion 30 can be connected to opposite sides of the corresponding recess 84.

As in the illustrated embodiment, the leading side 36 of each insulator body 22 can include multiple counteracting frangible portions 30. For example, each leading side 36 can include two counteracting frangible portions 30, and the counteracting frangible portions 30 can be positioned equidistant from or balanced around a longitudinal center of the longitudinal leading side 36 of each insulator body 22. Similarly, the sides 36 and 38 of each insulator body 22 can include multiple frangible connectors 26, and the frangible connectors of each longitudinal side can be positioned equidistant from or balanced around a longitudinal center of the longitudinal leading side of each insulator body 22. For example, the sides of each insulator body 22 can include five frangible connectors 26, with two pairs balanced around a longitudinal center of the longitudinal side of each insulator body 22, and one positioned on the longitudinal center.

The frangible connectors 26 can extend longitudinally between opposite connected ends in a connector direction that is substantially parallel to direction or plane 68, which extends substantially perpendicular to the longitudinal leading and trailing sides 36 and 34, respectively, of the insulator bodies 22. The frangible connectors 26 can be designed to break across a connector cross-section generally indicated by plane 70, which extends substantially parallel to the longitudinal leading and trailing sides 36 and 34, respectively, of the insulator bodies 22. Thus, the frangible connector 26 and counteracting frangible portions 30 can extend in longitudinal directions that are substantially perpendicular to each other, and can be designed to break across cross-sections that are substantially perpendicular to each other.

The insulator bodies 22 of the example embodiment are symmetrical so that either end of the cable staple assembly 20 can be inserted into a staple driving tool 32 as the leading end. In any event, the frangible connectors 26 are provided on the trailing side 34 of each connector body 22, while the counteracting frangible portions 30 are provided on the opposite, leading side 36 of each connector body 22. The dual breaking or shearing of the frangible connectors 26 and the counteracting frangible portions 30 on opposite sides of the insulator bodies 22 as the lead subassembly 38 is driven from the tool 32 can counteract problematic rotation of the lead staple and connector body sub-assembly 38 within the drive channel 76 of the tool 32, as described hereinafter.

Each insulator body 22 can have an insulator bridge 42 extending between a pair of leg recesses 40. Each staple 24 has a pair of legs 48 that extend from opposite ends of a staple crown 50. The legs 48 are respectively received in the leg recesses 40 of one of the insulator bodies 22. An upper end of each leg recess 40 can provide a narrowed portion or pinch point 46 that engages against the staple legs 48 adjacent where the crown 50 and legs 48 meet. The narrowed portions 46 can frictionally engage the staple legs 48 to help retain the position of the insulator body 22 relative to the staple 24 in a shipping configuration. For example, the insulator body 22 can be positioned and retained at an upper end of the staple 24, with the insulator bridge 42 receiving or engaging the staple crown 50 so that all of the driving force of the tool 32 goes to setting the staple 24 and not to also sliding the insulator body 22 from a bottom end to the top end of the staple 24. Outer lateral sides 52 of the leg recesses 40 of the insulator body 22 can be tapered laterally outwardly and downwardly from the narrowed portion or pinch point 46 to facilitate outward rotation or pivoting of the insulator legs 66 and arching of the insulator bridge 42 as described hereinafter.

The insulator bridge 42 can have an upper bridge profile 44 defined by an upper surface of the insulator bridge 50. The staple crown 50 can have a lower crown profile 54 defined by a lowermost surface of the staple crown 50 that is directly adjacent to, and directly opposing the upper surface or upper bridge profile 44. The upper bridge profile 44 can be defined by two raised end portions 56 and/or a recessed or lowered central portion 58 extending between the two raised end portions 56. The lower crown profile 54 of the staple 24 can extend between and along the opposite ends 60 and can be substantially linear, planar or flat. Thus, the lower crown profile 54 and the upper bridge profile 44 can have opposite end portions 58 and 60, respectively, that engage against each other adjacent the opposite ends of the staple crown 50 while central portions 58 and 62 are spaced from each other to provide a central space 64 between central portions 58 and 62 of the insulator bridge 42 and the staple crown 50. This central space 64 enables the central portion 58 of the bridge 42, including its upper bridge surface or profile 44, to arch upwardly without engaging against the adjacent, opposing central portion 62 of the staple crown 50, including its lower crown surface or profile 54.

The cable staple assembly 20 can further be designed to interact with the cable staple driving tool 32 and a cable 72 as described herein. The cable staple driving tool 32 can include a nosepiece 78 including a driver 74 and a drive path or channel 76. The nosepiece 78 can additionally include at least one cooperating breaking portion 80. The cooperating breaking portion 80 can be in the form of two protrusions 82. As the lead staple and connector body sub-assembly 38 is moved into position or alignment with the drive channel 76, the cooperating breaking portion 80 is received within the recess 84 of the leading side 36 of the insulator body 22.

When initially received within the recess 84 of the insulator body 22, the protrusion 82 can be vertically spaced from the corresponding counteracting frangible portion 30, leaving a vertical gap 86 therebetween. The counteracting frangible portion 30 is designed to be spaced from the cooperating breaking portion 80 of the staple driving tool 32 during an initial period of the staple setting operation of the tool. During the staple setting operation of the tool 32, the driver 74 engages the staple 24. The resulting movement of the lead staple and connector body sub-assembly 38 can initially act upon the frangible connectors 22, but not on the counteracting frangible portions 30 until the lead sub-assembly 38 moves sufficiently to close the gap 86. This can help cause the frangible connectors 22 to break simultaneously with or before the counteracting frangible portions 30 break. This can help reduce the possibility that the sub-assembly 38 will rotate problematically counterclockwise as it travels through the drive channel 76. This can also help increase the possibility that the sub-assembly 38 will remain substantially aligned with the drive channel or will rotate slightly clockwise as it travels through the drive channel 76.

Because the counteracting frangible portions 30 are independent of the frangible connectors 26 as noted above, they have not been impacted or modified by the separation of the prior adjacent insulator and staple subassembly at the point in time that each subassembly becomes the lead subassembly 38 within the staple driving tool 32. This means that both the relevant frangible connectors 26 and counteracting frangible portions 30 of the lead staple subassembly 38 remain in their original or designed state. As such, both the relevant frangible connectors 26 and counteracting frangible portions 30 of the lead subassembly 38 retain their original designed force required to break or shear them. This makes the behavior of both the relevant frangible connectors 26 and counteracting frangible portions 30 much more predictable. Thus, the relative balancing of the forces on opposite sides 34 and 36 of the lead subassembly 38 as the relevant frangible connectors 26 and counteracting frangible portions 30 are broken or sheared can be reliably controlled, known, and repeatably provided.

Figure 7:
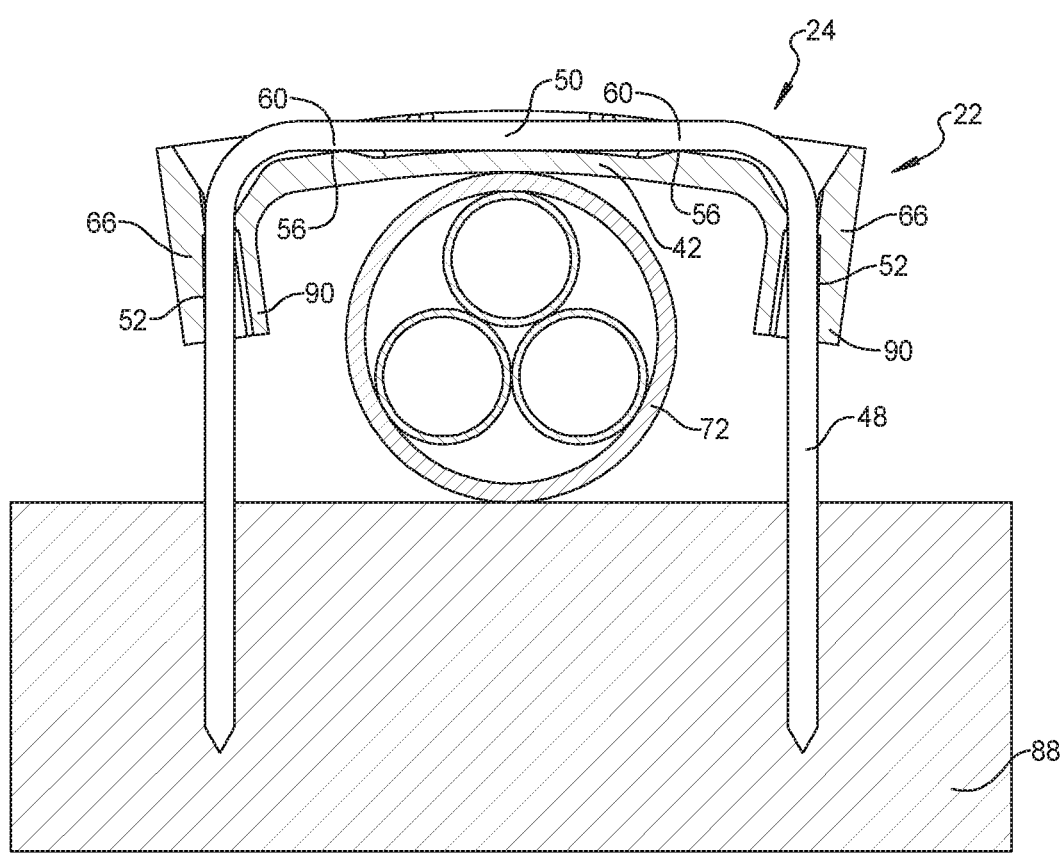
FIG. 7 is a cross-sectional view of the cable staple assembly of FIG. 1 in a post-driven, deployed or deformed state.

The staple 24 can be designed to transfer a driving force from the driver 74 to the insulator body 22 by engagement of the lower crown profile 54 of the staple 24 against the upper bridge profile 44 of the insulator body 22. With particular reference to FIG. 7, as the sub-assembly 38 is set into a base 88, such as a wooden 2-by-4, around an electrical cable 72, the electrical cable 72 can engage an underside of the central portion 58 of the insulator bridge 42. The central portion 58 of the insulator bridge 42 can be deformable by arching upward toward the central portion 52 of the staple crown 50 without the central portions contacting each other, at least until the space 64 closes.

Figure 6:
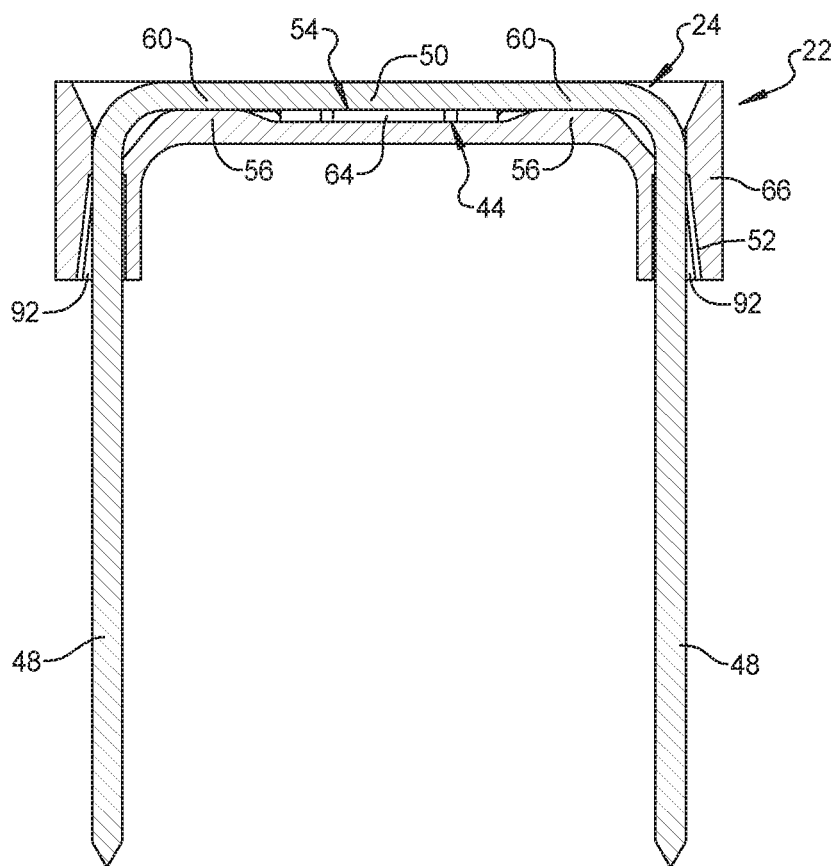
FIG. 6 is a cross-sectional view of the cable staple assembly of FIG. 1 in a pre-driven, shipping or undeformed state.

As central portion 58 of the insulator bridge 42 arches upwardly toward the staple crown 50, the insulator legs 66 can rotate inwardly toward each other at their lower ends 90. As shown in FIG. 6, the outwardly and downwardly tapered outer lateral sides 52 can provide a space or gap between the outer side of the staple leg 48 and the corresponding outer lateral side 52 of the leg recess 40 at the lower end 90 of the insulator leg 66. As shown in FIG. 7, the insulator legs 66 can rotate inwardly toward each other at their lower ends 90 without contacting the tapered outer lateral sides 52, at least initially. This can facilitate rotational movement of the insulator legs 66 as the central portion 58 of the insulator bridge 42 arches upwardly toward the staple crown 50.

As should be apparent, designing the insulator bridge 42 to be deformable upwardly toward the staple crown 50 and into the central space 64 reduces the biting force of the insulator body 22 on the electrical cable 72. In effect, the deformation of the insulator bridge 42 operates like a spring, reducing the force on the electrical cable 72, while allowing the staple legs 48 to move deeper into the base 88. Similarly, designing the lower ends 90 of the insulator legs 66 to be rotatable toward the corresponding staple legs 48 and into a space 92 provided therebetween by the tapered outer lateral sides 52 of the leg recess 40 can also reduce the biting force of the insulator body on the electrical cable 72. In effect, this operates like a reduction in the spring constant of the insulator bridge 42, reducing the biting force of the insulator body 22 on the electrical cable 72, while allowing the staple legs 48 to move deeper into the base 88. Thus, these can individually and collectively provide a broader range of driver force settings of the staple driving tool 32 that are large enough to hold the electrical cable 72, but not so large that the insulator body 22 problematically bites into the electrical cable 72 and damages it.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cable staple assembly for use with a staple driving tool having a driver and a cooperating breaking portion, the cable staple assembly comprising:

a plurality of insulator bodies having frangible connectors extending between adjacent pairs of the insulator bodies, each of the insulator bodies having a counteracting frangible portion, and an insulator bridge extending between a pair of leg recesses, the frangible connectors alone extending between and coupling the plurality of insulator bodies together into a strip, and each counteracting frangible portion being spaced from the frangible connectors and being coupled solely to a single one of the plurality of insulator bodies; and a plurality of staples, each staple having a pair of legs extending from opposite ends of a staple crown with the pair of legs being received in the pair of leg recesses of one of the insulator bodies.

2. The cable staple assembly of claim 1, wherein the counteracting frangible portion is on a leading side and the frangible connectors are on an opposite, trailing side of each of the insulator bodies.

3. The cable staple assembly of claim 2, wherein the counteracting frangible portion is designed to be broken by engagement with the cooperating breaking portion of the staple driving tool during a staple setting operation of the tool.

4. The cable staple assembly of claim 3, wherein the counteracting frangible portion is designed to be spaced from the cooperating breaking portion of the staple driving tool during an initial period of the staple setting operation of the tool.

5. The cable staple assembly of claim 1, wherein the frangible connectors extend longitudinally in a first direction and the counteracting frangible portion extends in a second longitudinal direction that is substantially perpendicular to the first direction.

6. The cable staple assembly of claim 1, wherein the frangible connectors are designed to break across a connector cross-section extending substantially parallel to longitudinal sides of the insulator bodies, and wherein the counteracting frangible portion is designed to break across a counteracting cross-section extending substantially perpendicular to the longitudinal sides of the insulator bodies.

7. The cable staple assembly of claim 1, wherein each of the insulator bodies further comprise a second counteracting frangible portion, and wherein the counteracting frangible portion and the second counteracting frangible portion are both on a leading longitudinal side of the insulator body.

8. The cable staple assembly of claim 1, wherein the counteracting frangible portion spans across a recess in the leading side of the insulator body, and the recess is designed to receive the cooperating breaking portion of the staple driving tool.

9. The cable staple assembly of claim 8, wherein the counteracting frangible portion is designed to be spaced from the cooperating breaking portion of the staple driving tool during an initial period of the staple setting operation of the tool.

10. A cable staple assembly comprising:
a plurality of insulator bodies frangibly coupled together into a strip, each insulator body having an insulator bridge extending between a pair of leg recesses, the insulator bridge having an upper bridge profile;
a plurality of staples, each staple having a pair of legs extending from opposite ends of a staple crown having a lower crown profile with the pair of legs being received in a respective pair of leg recesses of one of the insulator bodies and with the lower crown profile opposing the upper bridge profile; and
the lower crown profile and the upper bridge profile having opposite end portions engaging each other adjacent the opposite ends of the staple crown and having central portions spaced from each other and extending between the engaging opposite end portions to provide a central space between corresponding central portions of the insulator bridge and the staple crown with the central portion of the insulator bridge having a structure including an upper surface designed to deform into an upwardly curved, arching shape toward the central portion of the staple crown to reduce a distance therebetween corresponding to a height of the central space.

11. The cable staple assembly of claim 10, wherein the staple is designed to transfer a driving force to the insulator body by engagement of the lower crown profile of the staple against the upper bridge profile of the insulator body.

12. The cable staple assembly of claim 10, wherein the central portion of the insulator bridge is deformable into contact with the central portion of the staple crown.

13. The cable staple assembly of claim 10, wherein each of the opposite end portions of the upper bridge profile of each of the insulator bodies comprises a raised portion.

14. The cable staple assembly of claim 13, wherein the lower crown profile of the staple is substantially linear.

15. The cable staple assembly of claim 10, wherein the central portion of the upper bridge profile of each of the insulator bodies is recessed relative to the opposite end portions of the upper bridge profile.

16. The cable staple assembly of claim 10, wherein the pair of leg recesses have tapered lateral outer sides to facilitate rotational movement of the leg recesses as the central portion of the insulator bridge arches toward the central portion of the staple crown.

17. The cable staple assembly of claim 10, wherein an upper end of each of the leg recesses has a pinch point frictionally engaging the staple legs and outer lateral sides of the leg recesses taper outward from the pinch point.

\* \* \* \* \*